United States Patent [19]

Tsubota et al.

[11] Patent Number: 5,031,928
[45] Date of Patent: Jul. 16, 1991

[54] WHEEL ALIGNMENT ADJUSTING MECHANISM

[75] Inventors: Yasumasa Tsubota; Yutaka Endo, both of Zama, Japan

[73] Assignee: Nissan Motor Co., Ltd., Yokohama, Japan

[21] Appl. No.: 239,636

[22] Filed: Sep. 2, 1988

[30] Foreign Application Priority Data

Sep. 3, 1987 [JP] Japan .............................. 62-219265

[51] Int. Cl.⁵ .............................................. B62D 17/00
[52] U.S. Cl. .................................................... 280/661
[58] Field of Search ............................... 280/661, 675

[56] References Cited

U.S. PATENT DOCUMENTS

| 3,526,413 | 9/1970 | Muller | 280/661 |
| 4,537,420 | 8/1985 | Ito et al. | 280/661 |
| 4,614,359 | 9/1986 | Lundin et al. | 280/661 |
| 4,616,845 | 10/1986 | Pettibone | 280/661 |
| 4,619,465 | 10/1986 | Johnson | 280/661 |
| 4,695,073 | 9/1987 | Pettibone et al. | 280/661 |
| 4,706,987 | 11/1987 | Pettibone et al. | 280/661 |
| 4,736,964 | 4/1988 | Specktor | 280/661 |

FOREIGN PATENT DOCUMENTS

| 0071250 | 2/1983 | European Pat. Off. . |
| 1451549 | 9/1966 | France . |
| 2036241 | 6/1980 | United Kingdom . |

Primary Examiner—Andres Kashnikow
Assistant Examiner—Eric Culbreth
Attorney, Agent, or Firm—Foley & Lardner

[57] ABSTRACT

A wheel alignment adjusting mechanism for a rear suspension system for an automotive vehicle. The wheel alignment adjusting mechanism is comprised of a rear upper link for movably connecting a wheel supporting member and a bracket projecting from a suspension member assembly. The rear upper link is pivotally connected at one end thereof with the bracket through a pivot pin. The pivot pin is movably fitted within elongate openings which are formed respectively in two side plate sections of the brackets. The longitudinal axis of each elongate opening inclines to be lowered in the outboard direction by an angle of 30 degrees relative to a horizontal plane in a vehicle body, thereby maintaining smaller change amounts in wheel alignment along with suspension stroke.

14 Claims, 6 Drawing Sheets

WHEEL ALIGNMENT ADJUSTING MECHANISM

BACKGROUND OF THE INVENTION

1. Field of the Invention

This invention relates to improvements in a mechanism for adjusting wheel alignment of a vehicle, and more particularly to a device for maintaining smaller the change in wheel alignment even upon suspension stroke.

2. Description of the Prior Art

Wheel alignment of a vehicle largely influences vehicle cruising characteristics and driveability and therefore is important from the view points of safety and riding comfort of the vehicle. Usually vehicles are so arranged that wheel alignment is to be adjustable by a mechanism even after assembly thereof. An example of such a wheel alignment adjusting mechanism is disclosed in Japanese Utility Model Provisional Publication No. 56-24371, in which a pivot pin of a suspension link can be shifted within an elongate opening formed in a member on the side of a suspension member in order to adjust toe angle, camber angle and the like.

However, drawbacks have been encountered in such a conventional wheel alignment adjusting mechanism, in which toe angle change (the change amount in wheel alignment) along with suspension stroke (bound and rebound of road wheels) becomes larger and therefore the toe angle becomes far from a design standard (represented by the character d) as seen from the characteristics represented by characters $a_o$, $a_i$ in FIG. 7. The toe angle characteristics $a_o$, $a_i$ in FIG. 7 are obtained by using a double wish-bone type rear suspension system in which a pivot pin for the inboard end section of a rear upper link was displaced inboard and outboard by 2 mm within the elongate opening extending in a direction from the inboard to outboard sides of a vehicle body. This means that the vehicle cruising characteristics and driveability corresponding to an initial wheel alignment cannot be maintained and unavoidably changes, thereby causing a driver to get disoriented.

SUMMARY OF THE INVENTION

It is an object of the present invention to provide an improved wheel alignment adjusting mechanism which is less in amount of change in wheel alignment even upon suspension stroke, maintaining stable cruising characteristics and driveability.

The wheel alignment adjusting mechanism according to the present invention comprises a suspension link through which a road wheel and a suspension member connected to a vehicle body are movably connected with each other. An elongate opening is formed on the side of the suspension member and extends generally in the direction of inboard to outboard sides of the vehicle body. The longitudinal axis of the elongate opening inclines relative to a horizontal plane in the vehicle body so that the amount of change in wheel alignment along with suspension stroke is maintained smaller. The suspension link is pivotally connected at its one end with a pivot pin which is disposed within the elongate opening and movable in the longitudinal direction of the elongate opening.

Accordingly, dislocating the pivot pin for the suspension link within the elongate opening causes the road wheel to be displaced in a corresponding amount, thereby adjusting wheel alignment thus to decide an initial wheel alignment. Moreover, by virtue of inclination of the longitudinal axis of the elongate opening, the change amount of wheel alignment along with suspension stroke can be maintained smaller regardless of locations of the pivot pin within the elongate opening. This can maintain the vehicle cruising characteristics and driveability corresponding to the initial wheel alignment even if vehicle occupants increase or decrease and/or during a vehicle cruising with elastic bound and rebound of the road wheel, thereby preventing a driver from getting disoriented.

DETAILED DESCRIPTION OF THE INVENTION

Figure 1:
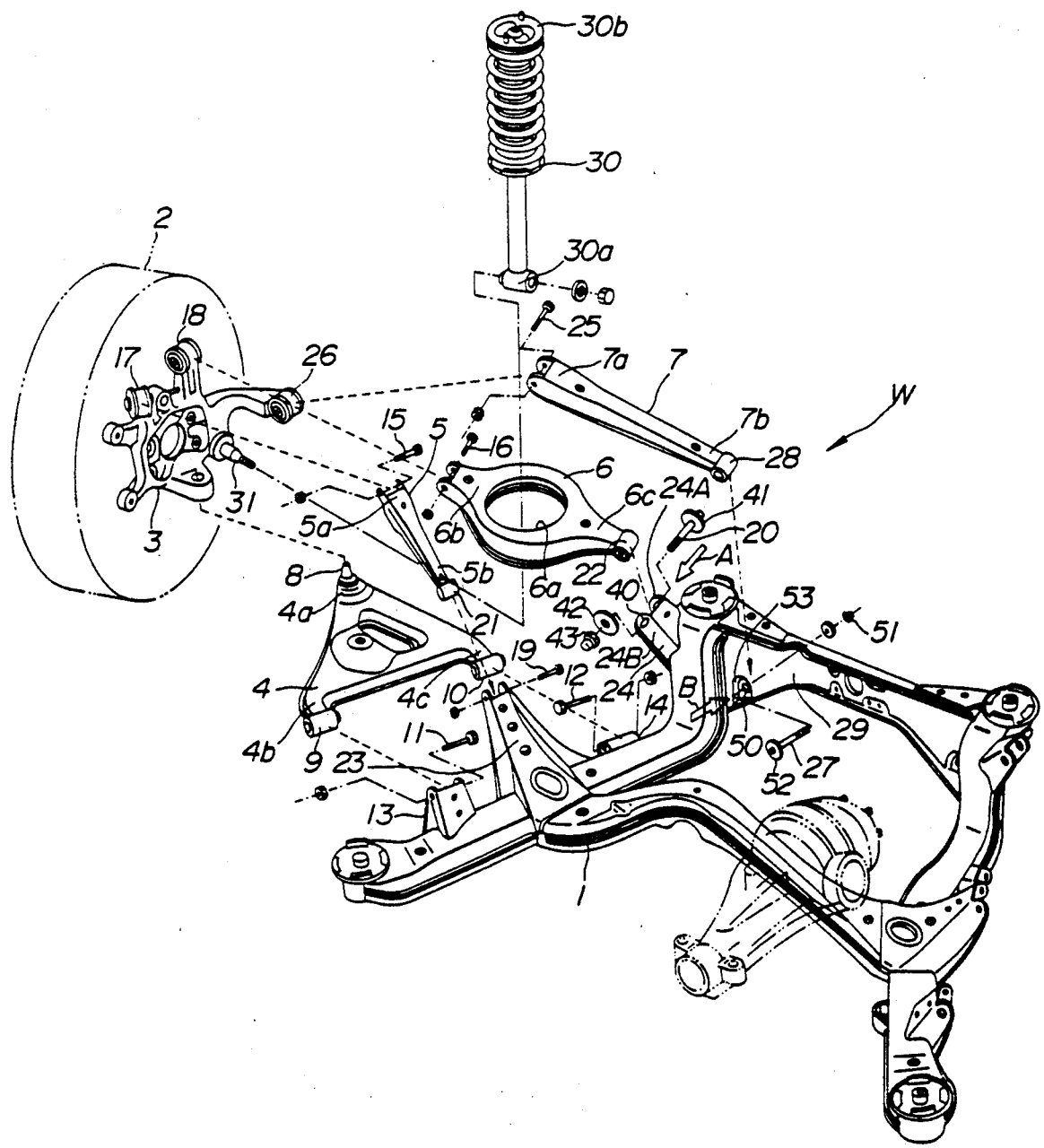
FIG. 1 is an exploded perspective view of an essential part of a rear suspension system for a vehicle, provided with an embodiment of a wheel alignment adjusting mechanism in accordance with the present invention.

Referring now to FIG. 1, there is shown an embodiment of a wheel alignment adjusting mechanism W in accordance with the present invention. In this embodiment, the wheel alignment adjusting mechanism W is incorporated in a rear suspension system for an automotive vehicle. The rear suspension system includes a suspension member assembly 1 which is secured to a vehicle body (not shown) of the automotive vehicle in a vibration insulating manner. A rear right wheel 2 is rotatably supported by a wheel supporting member 3 which is movably connected to the suspension member assembly 1.

An A-shaped arm 4, a front upper link 5, a rear upper link 6 and a lower link 7 are movably disposed in a manner to connect the wheel supporting member 3 and the suspension member assembly 1. The A-shaped arm 4 has an inboard tip corner section 4a which is connected through a ball joint 8 with the lower section of the wheel supporting member 3. The A-shaped arm 4 has two projecting outboard base end sections 4b, 4c which are respectively provided with elastic bushings 9, 10. The elastic bushings 9, 10 are respectively mounted on pivot pins 11, 12 which are respectively fixedly secured to brackets 13, 14 of the suspension member assembly 1. Accordingly, the projecting base end sections 4b, 4c are movably connected to the brackets 13, 14, respectively, in such a manner that the A-shaped member 4 is vertically movable relative to the vehicle body. The front upper link 5 has an outboard end section 5a which is provided with a pivot pin 15 which is installed in a bushing 17 secured at an upper section of the wheel supporting member 3 so that the front upper link 5 is pivotal relative to the wheel supporting member 3. The inboard end section 5b of the front upper link 5 is provided with an elastic bushing 21 mounted on a pivot pin 19 fixedly secured to a bracket 23 of the suspension member assembly 1 so that the front upper link 5 is vertically pivotally movable relative to the suspension member assembly 1. The rear upper link 6 is shaped generally annular to form an opening 6a and has an outboard end section 6b provided with a pivot pin 16. The pivot pin 16 is disposed in an elastic bushing 18 securely supported at an upper section of the wheel supporting member 3 so that the rear upper link 6 is vertically pivotally movable relative to the wheel supporting member 3. The inboard end section 6c of the rear upper link 6 is provided with an elastic bushing 22 mounted on a pivot pin 20 secured to the bracket 24 of the suspension member assembly 1 so that the rear upper link 6 is vertically pivotally movable relative to the suspension member assembly 1.

The lower link 7 has an outboard end section 7a which is provided with a pivot pin 25 which is inserted in an elastic bushing 26 secured at the rear and lower section of the wheel supporting member 3 so that the lower link 7 is vertically pivotally movable relative to the wheel supporting member 3. The inboard end section 7b of the lower link 7 is provided with an elastic bushing 28 which is mounted on a pivot pin 27 secured to a crossbar 29 of the suspension member assembly 1 in such a manner that the lower link 7 is vertically pivotally movable relative to the crossbar 29 of the suspension member assembly 1.

A strut or shock absorber 30 is disposed piercing the opening 6a of the rear upper link 6 and vertically extends. The strut 30 has a lower end section 30a pivotally connected to a laterally inboard extending shaft 31 of the wheel supporting member 3. The upper end section 30b of the strut 30 is connected to the vehicle body through a strut mount insulator (not shown).

Figure 6:
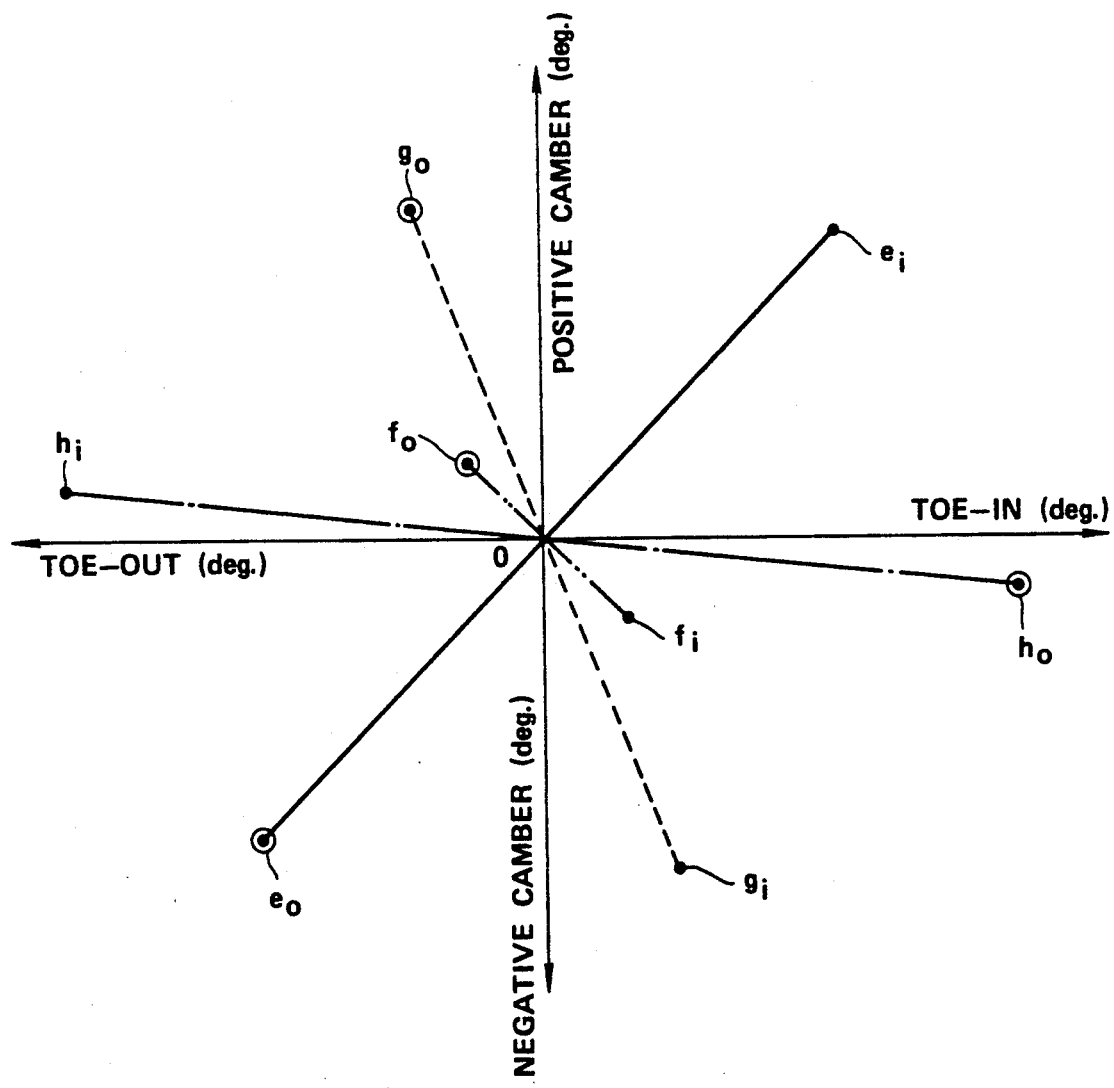
FIG. 6 is a graph showing the respective change amounts in wheel alignment upon dislocation of various suspension links of the suspension system of FIG. 1.

With the thus arranged rear suspension system, toe angle and camber angle alter as shown in FIG. 6 if the pivot pins of the suspension links are displaced inboard and outboard in the vehicle body. In FIG. 6, the characters $e_o$, $e_i$ indicate wheel alignment change amounts in case the pivot pin 11 of the A-shaped arm 3 is displaced outboard and inboard by 2 mm in the vehicle body, respectively. The characters $f_o$, $f_i$ indicate wheel alignment change amounts in case the pivot pin 19 of the front upper link 5 is displaced outboard and inboard by 2 mm in the vehicle body, respectively. The characters $g_o$, $g_i$ indicate wheel alignment change mounts in case the pivot pin 20 of the rear upper link 6 is displaced outboard and inboard by 2 mm in the vehicle body, respectively. The characters $h_o$, $h_i$ indicate alignment change amounts in case the pivot pin 27 of the lower link 7 is displaced outboard and inboard by 2 mm in the vehicle body, respectively.

Figure 2:
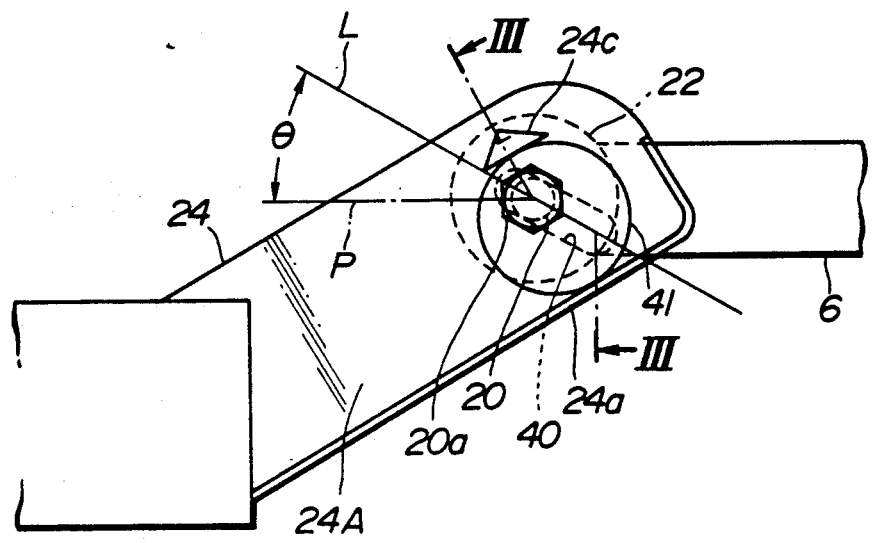
FIG. 2 is a side view of an essential part of the wheel alignment adjusting mechanism of FIG. 1, as viewed from the direction of an arrow A of FIG. 1.
Figure 3:
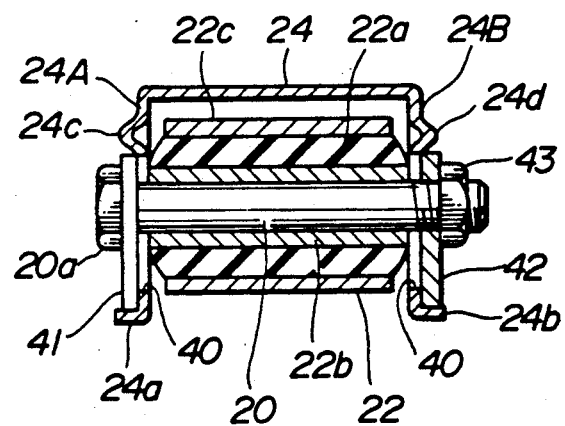
FIG. 3 is a cross-sectional view taken in the direction of arrows substantially along the line III—III of FIG. 2.
Figure 4:
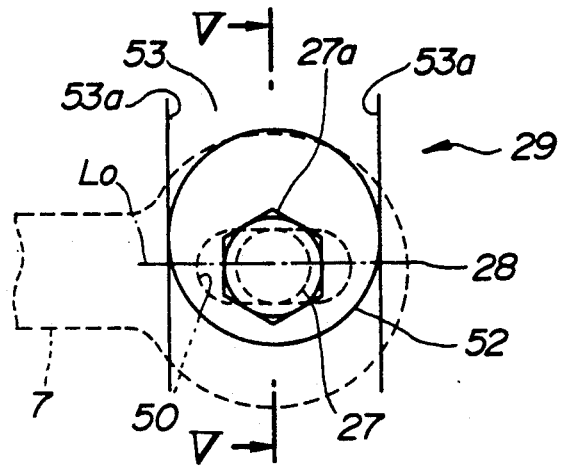
FIG. 4 is a side view of another essential part of the wheel alignment adjusting mechanism of FIG. 1, as viewed from the direction of an arrow B of FIG. 1.
Figure 5:
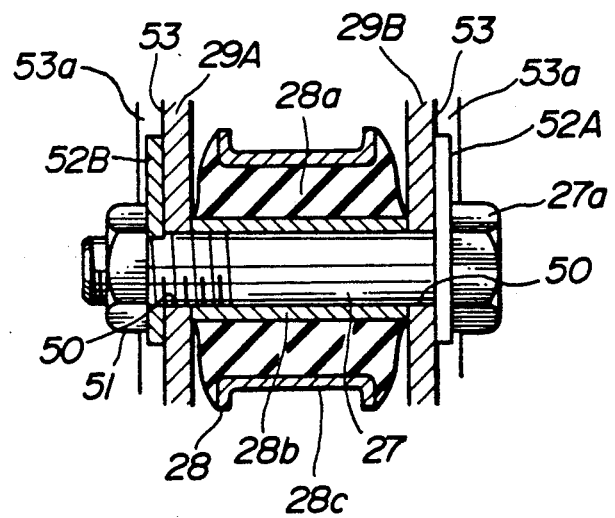
FIG. 5 is a cross-sectional view taken in the direction of arrows sustantially along the line V—V of FIG. 4.

As is apparent from FIG. 6, in order to adjust camber angle, it is preferable to displace the pivot pin 20 of the rear upper link 6 in the inboard and outboard directions of the vehicle because of the minimum influence to other alignments. Additionally, in order to adjust toe angle, it is preferable to displace the pivot pin 27 of the lower link 7 in the inboard and outboard directions of the vehicle body because of the minimum influence to other alignments. In view of the above, in this embodiment, a camber adjusting mechanism is employed in connection with the pivot pin 20 of the rear upper link 6 and arranged as shown in FIGS. 2 and 3, while a toe adjusting mechanism is employed in connection with the pivot pin 27 of the lower link 7 and arranged as shown in FIGS. 4 and 5.

The camber adjusting mechanism will be discussed with reference to FIGS. 2 and 3.

The bracket 24 includes two opposite side plate sections 24A, 24B which are spaced from each other and parallel with an imaginary vertical plane (not shown) to which a longitudinal axis of the vehicle body is perpendicular. In this connection, the crossbar 29 extends parallel with the imaginary vertical plane. The side plate sections 24A, 24B are respectively formed with elongate openings 40, 40 which are identical in shape and location, in the side plate sections. The pivot pin 20 is disposed piercing the elongate openings 40, 40 of the side plate sections 24A, 24B so as to be adjustably secured to the bracket 24. The elastic bushing 22 at the inboard end section of the rear upper link 6 is mountd on the pivot pin 20 as shown in detail in FIG. 3. The elastic bushing 22 includes a cylindrical elastomeric member 22a tightly interposed between an inner cylindrical member 22b and an outer cylindrical section 22c forming part of the inboard end section 6c of the rear upper link 6. The inner cylindrical member 22b is slidably mounted on the pivot pin 20.

A disc plate 41 having an eccentric opening is disposed between the hexagonal head 20a of the pivot pin 20 and the side plate section 24A of the bracket 24 under the state in which the pivot pin 20 pierces the elongate openings 40 of the side plate sections 24A, 24B of the bracket 24 and the eccentric opening of the disc plate 41. The eccentric opening of the disc plate 41 is located eccentric relative to the disc plate 41. The disc plate 41 is in tight contact with the pivot pin head 20a and the side plate section 24A of the bracket 24. Another disc plate 42 has an eccentric opening and is identical in shape with the disc plate 42. The disc plate 42 is interposed between a nut 43 which is engaged on the end section opposite to the head 20a under the state the pivot pin 20 pierces the elongate openings 40 of the side plate sections 24A, 24B of the bracket 24, and the eccentric opening of the disc plate 42. The disc plate 42 is in tight contact with the side plate section 24B and the nut 43. It will be understood that the nut 43 engaged with the pivot pin 20 functions to prevent the pivot pin 20 from getting out of the bracket 24 and additionally prevents the disc plate 42 from coming off.

The disc plate 41 is movably put between a flange 24a and a projecting portion 24c of the side plate section 24A. The flange 24a extends in the longitudinal direction of the side plate section 24A and projects outwardly from the side plate section 24A. The flange 24a is formed by bending the lower edge portion of the side plate section 24A. The projecting portion 24c is formed integral with the side plate section 24A. Additionally, the side plate section 24B is formed with a flange 24b and a projecting portion 24d which respectively correspond to the flange 24a and the projecting portion 24c in the side plate section 24A. Accordingly, the disc plate 42 is movably put between the flange 24b and the projecting portion 24d.

Figure 7:
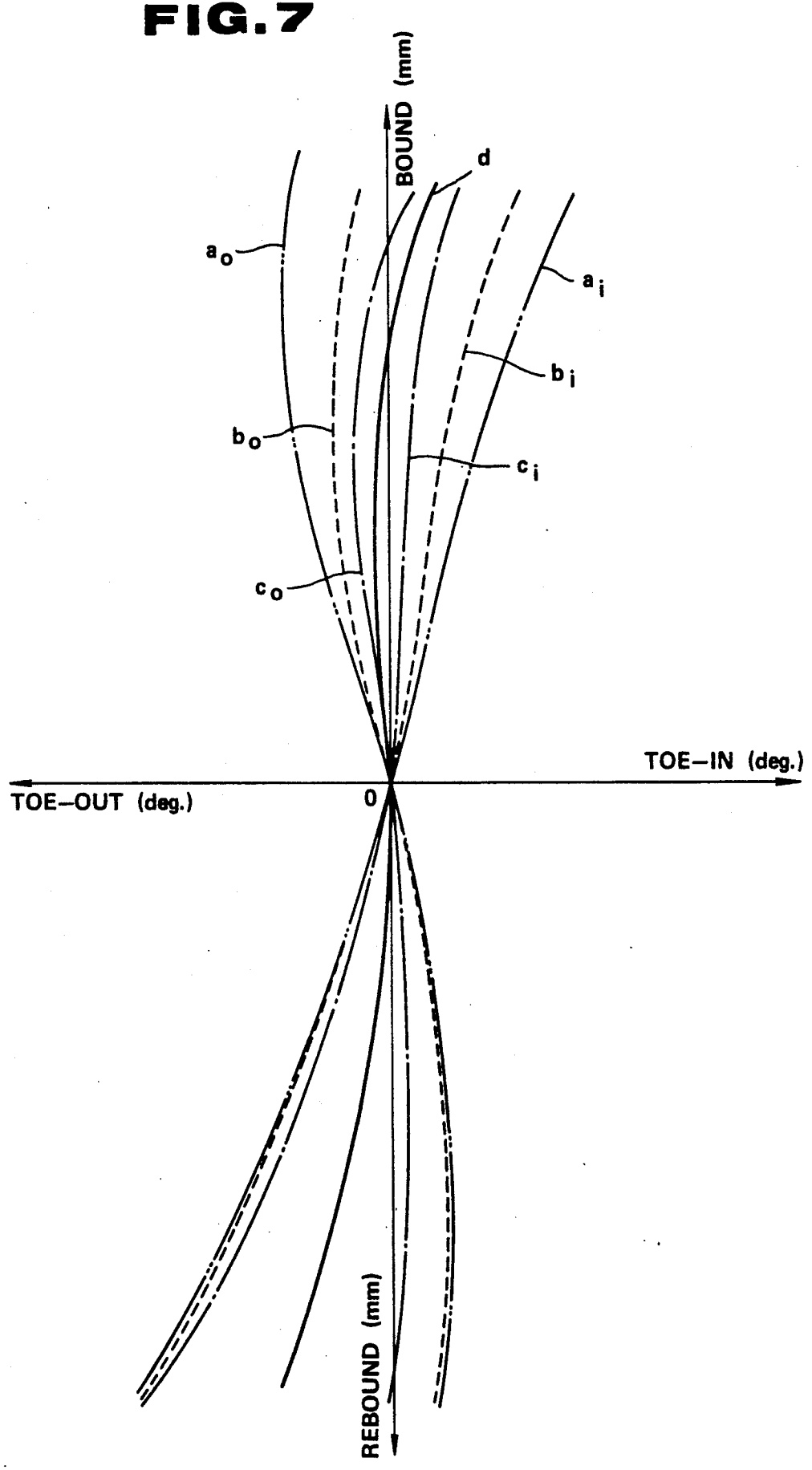
FIG. 7 is a graph showing the respective change amounts in wheel alignment in cases of various inclination angles of the longitudinal direction of an elongate opening in which a rear upper link pivot pin of the suspension system in FIG. 1 is disposed.

The elongate opening 40 of the side plate section 24A of the bracket 24 is arranged such that the longitudinal axis L thereof inclines as an angle $\theta$ relative to a horizontal plane P, on a plane containing the longitudinal axis L. The horizontal plane is horizontal relative to the vehicle body and generally parallel with a floor (not shown) of the vehicle body. Additionally, the longitudinal axis L of the elongate opening 40 is lowered relative to the horizontal plane P in a direction from the inboard side to the outboard side of the vehicle body as clearly shown in FIG. 2. It will be understood that the longitudinal axis L of the elongate opening 40 in the side plate section 24B inclines to the same degree as the side plate section 24A. The inclination angle $\theta$ of the longitudinal axis L of the elongate opening 40 is preferably selected at a larger value to approach a design standard d with reference to the characteristics indicated by characters $b_i$, $b_o$ and characters $c_i$, $c_o$ in FIG. 7. In FIG. 7, the character $b_i$ indicates a case in which the pivot pin 20 is displaced inboard by 2 mm in the elongate opening 40 having the longitudinal axis inclination angle $\theta$ of 30°, while the character $b_i$ indicates a case in which the pivot pin 20 is displaced outboard by 2 mm in the elongate opening 40 having the longitudinal axis inclination angle $\theta$ of 30°. The character $c_i$ indicates a case in which the pivot pin 20 is displaced inboard by 2 mm in the elongate opening 40 having the longitudinal axis inclination angle $\theta$ of 45°, while the character $c_o$ indicates a case in which the pivot pin 20 is displaced outboard by 2 mm within the elongate opening 40 having the longitudinal axis inclination angle $\theta$ of 45°. For reference, the characters $a_i$, $a_o$ indicate cases in which the pivot pin 20 is displaced inboard and outboard by 2 mm within the elongate opening having the longitudinal axis inclination angle ($\theta$) of 0°, respectively. It will be understood that the cases indicated by the characters $a_i$, $a_o$ are not within the scope of the present invention.

Figure 8:
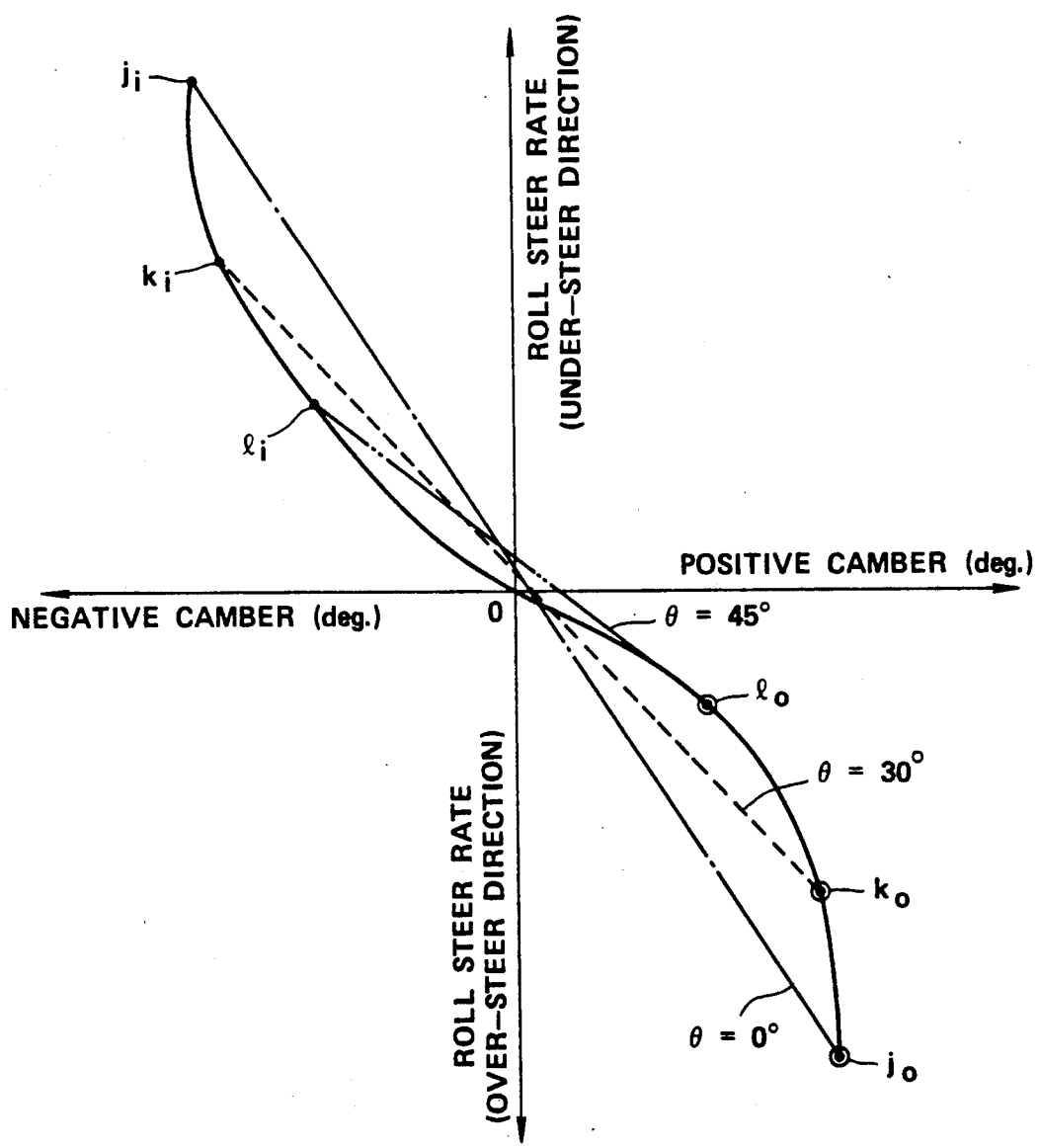
FIG. 8 is a graph showing the camber change amount and the roll steer rate upon dislocation of the rear upper link pivot pin of FIG. 7, in terms of the inclination angle of the longitudinal axis of the elongate opening.

In this connection, variation in camber angle (degree) and rate of roll steer upon bound of 40 mm are shown in FIG. 8. In FIG. 8, the characters $j_o$, $k_o$ and $l_o$ represent the cases in which the pivot pin 20 is displaced outboard by 2 mm within the elongate openings 40 having the longitudinal axis inclination angle $\theta$ of 0°, 30° and 45°, respectively. The characters $j_i$, $k_i$, $l_i$ represent the cases in which the pivot pin 20 is displaced inboard by 2 mm within the elongate openings 40 having the longitudinal axis inclination angle $\theta$ of 0°, 30° and 45°. The graph in FIG. 8 demonstrates that enlarging the longitudinal axis inclination angle $\theta$ of the elongate opening 40 reduces the roll steer rate. However if the longitudinal axis inclination angle $\theta$ is too large, a camber adjusting range is minimized even though the displacement amount (2 mm) of the pivot pin 20 is constant as seen from FIG. 8, thus lowering camber adjusting efficiency. In view of these, it will be understood that the longitudinal axis inclination angle $\theta$ of the elongate opening 40 is preferably about 30°.

Next a toe adjusting mechanism will be discussed with reference to FIGS. 4 and 5.

In this embodiment, the crossbar 29 includes two opposite side plate sections 29A, 29B which are spaced from and parallel with each other. An elongate opening 50 is formed in each side plate section 29A, 29B. The pivot pin 27 passes through the elongate openings 50 of the opposite side plate sections 29A, 29B, passing through the elastic bushing 28 of the lower link 7. The longitudinal axis $L_o$ of the elongate opening 50 is parallel with the horizontal plane P, on a vertical plane containing the longitudinal axis $L_o$. The elastic bushing 28 is located between the opposite side plate sections 29A, 29B and includes a cylindrical elastomeric member 28a securely disposed between an inner cylindrical member 28b and an outer cylindrical section 28c. The inner cylindrical member 28a is mounted on and in slidable contact with the pivot pin 27. The outer cylindrical section 28c forms part of the lower link 7. A disc plate 52A having an eccentric opening is disposed between the hexagonal head 27a of the pivot pin 27 and the side plate section 29B in such a manner as to be in tight contact with the pivot pin head 27a and the side plate section 29B, in which the pivot pin 27 passes through the eccentric opening of the disc plate 52A. The eccentric opening is located eccentric in the disc plate 52A. Another disc plate 52B having an eccentric hole is identical with the disc plate 52A and disposed between the side plate section 29A and a nut 51 engaged with the end section (opposite to the head 27a) of the pivot pin 27. The disc plate 52B is in tight contact with the side plate section 29A and with the nut 51. Each of the disc plates 52A, 52B slidably fits in a vertically extending groove 53 formed in the side plate sections 29A, 29B is such a manner that the periphery of the disc plate 52A, 52B is in slidable contact with the side walls 53a, 53a of the groove 53 so that the disc plate can be guided between the side walls 53a, 53a. The longitudinal axis of the grooves 53 is perpendicular to the longitudinal axis $L_o$ of the elongate opening 50. It will be understood that the longitudinal axis $L_o$ may inclines relative to the horizontal plane P.

The manner of operation of the thus arranged wheel alignment adjusting mechanism W will be discussed hereinafter.

In adjusting camber in the wheel alignment, first the pivot pin 20 is rotated by rotating the hexagonal head 20a upon loosening the nut 43. This rotates the disc plate 41, 42 together with the pivot pin 20, in which the disc plate 41, 42 moves upon being guided between the flange 24a, 24b and the projecting portion 24c, 24d so that the pivot pin 20 displaces along the length of the elongate opening 40. Accordingly, the rear upper link 6 is longitudinally displaced. Additionally, since the longitudinal axis inclination angle $\theta$ is 30°, camber adjustment can be achieved depending upon the displacement amount of the pivot pin 20 and according to the characteristics shown in FIG. 8.

Now, as appreciated from FIGS. 7 and 8, inclining the longitudinal axis of the elongate opening 40 by an angle ($\theta$) of 30° minimizes toe angle change (roll steer rate) caused by bound and rebound, as compared with the characteristics of the cases (represented by the characters, $j_i$, $j_o$) in which the elongate opening (40) has no inclination of the longitudinal axis. Accordingly, vehicle cruising characteristics and drivability corresponding to an initially set wheel alignment can be maintained even if vehicle passengers are reduced and/or even during vehicle cruising upon elastic bound of road wheels accompanying suspension stroke. This prevents a driver from getting disoriented while improving safety in vehicle driving.

In adjusting toe of the wheel alignment, first the pivot pin 27 is rotated by rotating the hexagonal head 27a upon loosening the nut 51. This causes the disc plates 52A, 52B to rotate together with the pivot pin 27, in which the disc plate 52A, 52B moves upon being guided between the side walls 53a, 53a of the groove 53. Accordingly, the pivot pin 27 is moved along the length of the elongate opening 50, and therefore the lower link 7 displaces longitudinally thereby adjusting toe angle of the wheel 2.

Thus in this embodiment, since camber adjustment is accomplished by displacing the upper link pivot pin 20 while toe adjustment is accomplished by displacing the lower link pivot pin 27, these adjustments hardly affect each other in alignment adjustment as apparent from FIG. 6. This provides the same effect as in a wheel alignment adjusting manner in which camber adjustment and toe adjustment are independently carried out, while facilitating wheel alignment adjusting operation.

In this embodiment, guiding the disc plates 41, 42, 52A and 52B is accomplished by the machined portions 24a, 24b, 24c, 24d; 53a, 53b of the conventional parts without requiring special separate parts. This lowers the production cost of the wheel alignment adjusting mechanism while facilitating to improve the accuracy of the guiding portions for the disc plates.

While the principle of the present invention has been shown and described as being applied only to the suspension system in which an upper link system is constituted of the front and rear upper links 5, 6, it will be understood that the principle may not be limited to be applied to it and therefore applied to suspension systems of the so-called double wish-bone type wherein, for example, a A-shaped arm is used as an upper link and to one of the so-called strut type such as parallel link type. The principle of the present invention is particularly effective if wheel alignment is adjusted with the A-shaped arm of the suspension system of the double wishbone type in which there is greater influence of suspension stroke (suspension movement due to bound and rebound of road wheels) to wheel alignment.

What is claimed is:

1. A wheel alignment adjusting mechanism for a vehicle, comprising:
    a wheel supporting member on which a road wheel is rotatably supported;
    a suspension member connected to a vehicle body and having first, second, third and fourth supporting sections;
    first, second, third and fourth suspension links, each suspension link having first and second end sections which are pivotally connected respectively to each suspension member supporting section and said wheel supporting member, the first end sections of said first, second, third and fourth suspension links being pivotally connected respectively to the first, second, third and fourth supporting sections of said suspension member, said first and second suspension links being located separate from said third and fourth suspension links with respect to a vertical direction of the vehicle body, said first and second suspension links being located separate from each other with respect to a horizontal direction of the vehicle body;
    at least one elongate opening being formed in at least one of said suspension member supporting sections, said elongate opening extending generally in a direction inboard to outboard of the vehicle body;
    a pivot pin fixably disposed in said elongate opening and adjustably movable in a longitudinal direction of said elongate opening, the first end section of one of said suspension links being mounted on said pivot pin; and
    means for inclining a longitudinal axis of said elongate opening relative to a horizontal plane in the vehicle body, the longitudinal axis of said elongate opening being lowered in an outboard direction relative to the horizontal plane in the vehicle body.

2. A wheel alignment adjusting mechanism as claimed in claim 1, wherein the longitudinal axis of said elongate opening inclines by an angle of about 30 degrees relative to the horizontal plane.

3. A wheel alignment adjusting mechanism as claimed in claim 1, wherein said first end section of said suspension link has an elastic bushing mounted on said pivot pin.

4. A wheel alignment adjusting mechanism as claimed in claim 3, wherein said suspension link has a second end section which is connected through an elastic bushing with a wheel supporting member for rotatably supporting said road wheel.

5. A wheel alignment adjusting mechanism as claimed in claim 1, wherein said at least one of said first, second, third, and fourth supporting sections of said suspension member includes first and second side plate sections which are parallel with each other and extend parallel with a vertical plane, in the vehicle body, to which a longitudinal axis of the vehicle body is perpendicular, each side place section being formed with said elongate opening said pivot pin passing through said elongate openings of said first and second side plate sections, said suspension link first end section being located between said first and second side plate sections.

6. A wheel alignment adjusting mechanism as claimed in claim 1, wherein said first, second, third and fourth suspension links are generally parallel and extend generally along a lateral direction of the vehicle body.

7. A wheel alignment adjusting mechanism as claimed in claim 6, further comprising a fifth suspension link having a first end section pivotally connected to a fifth supporting section of the suspension member, and said fifth suspension link extending generally along a longitudinal direction of the vehicle body.

8. A wheel alignment adjusting mechanism as claimed in claim 7, wherein said fourth and fifth suspension links are integral with each other to form an A-shaped arm member.

9. A wheel alignment adjusting mechanism as claimed in claim 1, wherein said first suspension link is located rearward of said second suspension link with respect to a vehicle advancing direction, and said third suspension link is located rearward of said fourth suspension link with respect to the vehicle advancing direction.

10. A wheel alignment adjusting mechanism as claimed in claim 9, wherein the second end sections of said first and second suspension links are located at an upper side of a horizontal plane containing an axis of the road wheel, and the second end sections of said third and fourth suspension links are located at a lower side of said horizontal plane.

11. A wheel alignment adjusting mechanism as claimed in claim 10, wherein said elongate opening defining means includes means defining at least one elongate opening which is formed in at least one of said first and second supporting sections of said suspension member.

12. A wheel alignment adjusting mechanism as claimed in claim 11, wherein said elongate opening defining means includes means defining an elongate opening which is formed in said first supporting section of said suspension member.

13. A suspension system for a vehicle, comprising:

a wheel supporting member on which a road wheel is rotatably supported;

a suspension member connected to a vehicle body and having first, second, third and fourth supporting sections;

first, second, third and fourth suspension links, each suspension link having first and second end sections which are pivotally connected respectively to each suspension member supporting section and said wheel supporting member, the first end sections of said first, second, third and fourth suspension links being pivotally connected respectively to the first, second, third and fourth supporting sections of said suspension member, said first and second suspension links being located separate from said third and fourth suspension links with respect to a vertical direction of the vehicle body, said first and second suspension links being located separate from each other with respect to a horizontal direction of the vehicle body; and means for adjusting a wheel alignment of the vehicle, including at least one elongate opening being formed in at least one of said suspension member supporting sections, said elongate opening extending generally in a direction inboard to outboard of the vehicle body;

a pivot pin fixably disposed in said elongate opening and adjustably movable in a longitudinal direction of said elongate opening, the first end section of one of said suspension links being mounted on said pivot pin; and means for inclining a longitudinal axis of said elongate opening relative to a horizontal plane in the vehicle body, the longitudinal axis of said elongate opening being lowered in an outboard direction relative to the horizontal plane in the vehicle body.

14. A method of aligning a vehicle wheel which is rotatably supported on a wheel supporting member, said vehicle including a suspension member connected to a vehicle body and having first, second, third and fourth supporting sections and first, second, third and fourth suspension links, each suspension link having first and second end sections which are pivotally connected respectively to each suspension member supporting section and said wheel supporting member, the first end sections of said first, second, third and fourth suspension links being pivotally connected respectively to the first, second, third and fourth supporting sections of said suspension member, said first and second suspension links being located separate from said third and fourth suspension links with respect to a vertical direction of the vehicle body, said first and second suspension links being located separate from each other with respect to a horizontal direction of the vehicle body, the first end of at least one of said suspension links on a pivot pin disposed in an elongate opening formed in the respective suspension member supporting section, said elongate opening extending generally in a direction inboard to outboard of the vehicle body and being inclined relative to a horizontal plane in the vehicle body, the longitudinal axis of said elongate opening being lowered in an outboard direction relative to the horizontal plane in the vehicle body said method comprising the steps of:

preparing the pivot pin for translation, and then, translating said pivot pin longitudinally within said elongate opening, thereby adjusting the position of said at least one suspension link and adjusting a camber of said wheel without affecting a toe of said wheel.

* * * * *